United States Patent [19]

Franken et al.

[11] 4,237,480

[45] Dec. 2, 1980

[54] TELEVISION CAMERA WITH PICK-UP TUBE MOUNTING MEANS

[75] Inventors: Adrianus J. J. Franken; Wolter W. J. Degger, both of Eindhoven, Netherlands

[73] Assignee: U.S. Philips Corporation, New York, N.Y.

[21] Appl. No.: 44,610

[22] Filed: Jun. 1, 1979

[30] Foreign Application Priority Data

Jun. 19, 1978 [NL]  Netherlands .......................... 7806570

[51] Int. Cl.³ ............................................... H04N 9/04
[52] U.S. Cl. ..................................... 358/55; 358/225; 358/229
[58] Field of Search ........................... 358/55, 225, 229

[56] References Cited

U.S. PATENT DOCUMENTS 3,712,604   1/1973   Nation ............................. 358/229 X Primary Examiner—Robert L. Richardson
Attorney, Agent, or Firm—Thomas A. Briody; William J. Streeter; Edward W. Goodman

[57] ABSTRACT

A television camera in which a color splitting prism and a number of pick-up tubes are positioned, with respect to each other in a holder which comprises an annular seat for optical alignment of each pick-up tube, the relevant pick-up tube being pressed onto said seat, by way of an adapter ring connected thereto transversely of the tube axis, by means of a resilient pressure member which acts in the direction of the tube axis. The diameter of the parts of the seat and the adapter ring decreases in the pressing direction. The pick-up tubes fit in the holder in a locating manner and, after being pressed, do not exhibit play with respect to each other, so that variations of the position with respect to each other in reaction to shocks, and inherent picture registration errors, are avoided.

6 Claims, 6 Drawing Figures

TELEVISION CAMERA WITH PICK-UP TUBE MOUNTING MEANS

BACKGROUND OF THE INVENTION

The invention relates to a television camera in which a color splitting prism and a number of pick-up tubes are positioned with respect to each other, in a holder which comprises an annular seat for the optical alignment of each pick-up tube, each pick-up tube being pressed onto said respective seat, by way of an adapter ring which is connected to the tube transversely of the tube axis by means of a resilient pressure member which acts in the direction of the tube axis. The invention also relates to a pick-up tube which is suitable for use in a camera of this kind and which comprises a cylindrical, glass tube which is sealed at one end by an end wall wherethrough electrical connections are passed, and on the other end by a light-admitting entrance window which is directed transversely of the tube axis.

Netherlands Patent Application No. 76.11.284, which corresponds to co-pending U.S. patent application Ser. No. 835,632, filed Sept. 22, 1977, now abandoned, describes a television camera of the kind set forth in which the holder comprises cylindrical openings for three pick-up tubes. In each of the openings there is provided an annular seat comprising, viewed in the direction of the tube axis, an axial and a radial reference face. In a jacket bushing, each pick-up tube forms one unit with a mumetal bushing and a coil unit and is pressed, by way of an end of the jacket bushing which is to be considered as an adapter ring, into a seat against the axial reference face. In the radial sense, the end of the jacket bushing to be considered as an adapter ring is located by the radial reference face in the seat.

In the known camera, the seat in the holder opening, as well as the part of the jacket bushing of the tube unit to be considered as an adapter ring, is provided with an axial and a radial reference face, viewed in the direction of the tube axis. For accurate and stable positioning of the pick-up tube in the holder, the radial and the axial reference faces must be accurately formed to be exactly perpendicular to each other, which requires difficult and expensive operations. Moreover, in order to allow the pick-up tube to be mounted in the seat, a given play between the jacket bushing and the radial reference face of the seat is required. Mechanical shocks, occurring notably and frequently when the tubes are used in portable cameras, are liable to change the position of the pick-up tubes in the seats in the holder as a result of this radial play. Consequently, the optical positions of picture rasters to be scanned on the photosensitive layers of the pick-up tubes will also change with respect to each other, thus giving rise to picture registration errors. These picture registration errors occur notably in television cameras utilizing small pick-up tubes with a picture raster having a very small surface area. If this surface area is, for example, 5.6×4.2 mm², in the case of imaging by means of 625 lines, a very small shift of a few μm causes a picture shift which is so annoying that electronic readjustment of the picture registration is necessary.

SUMMARY OF THE INVENTION

The invention has for its object to mitigate the described drawbacks; to this end, a television camera in accordance with the invention is characterized in that the diameter of the parts of the seat and the adapter ring which are to be pressed together decreases in the pressing direction. As a result of their simple shape, the seat as well as the adapter ring can be manufactured by simple operations, so they can be comparatively cheap. After mounting, the holder and the pick-up tube, having a locating fit, do not exhibit play with respect to each other and, after pressing, the positioning is even insusceptible to shocks due to the playfree mounting, so that errors in the picture registration due to shocking of the camera are counteracted.

A particularly sturdy television camera in accordance with the invention is characterized in that one of the parts of the seat and the adapter ring to be pressed together is shaped as a circular cone, while the other part has a cross-section, viewed in a plane through the tube axis, which is slightly curved towards the surface of the circular cone. When pressed together, the contacting parts of the seat and the adapter ring will be slightly elastically deformed to form a contact surface. Because the seat and the adapter ring then have a surface in common, the relative position of the seat and the adapter ring, and hence the relative position of the holder and the pick-up tube, is stable also in the case of high impact loads.

A particularly simple and hence comparatively cheap camera comprises pick-up tubes of the described kind, characterized in accordance with the invention in that near the entrance window the cylindrical glass tube is provided with an adapter ring which is directed transversely of the tube axis. The adapter ring preferably consists of an adapter collar formed on the glass. As a result of the provision of the adapter collar on the glass tube, for example, by means of a grinding operation or a hot glass treatment, alignment thereof transversely to the tube axis can be very accurately performed during manufacture.

DESCRIPTION OF THE DRAWINGS

The invention will be described in detail hereinafter, by way of example, with reference to the accompanying diagrammatic drawings.

DESCRIPTION OF THE PREFERRED EMBODIMENTS

Figure 1:
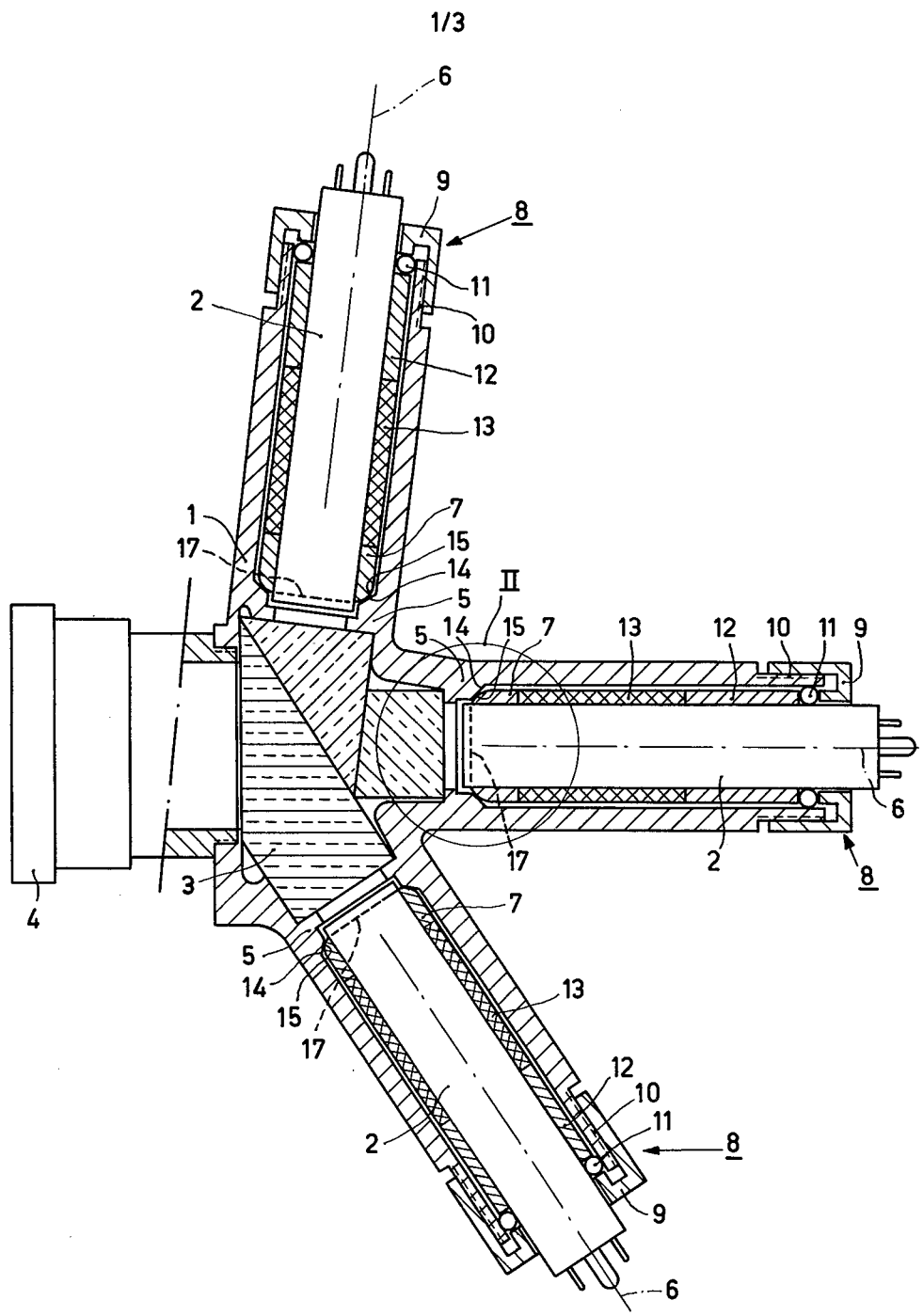
FIG. 1 is a sectional view of a relevant part of a television camera in accordance with the invention.

FIG. 1 shows a part of a television camera, comprising a holder 1 in which three pick-up tubes 2 are positioned with respect to each other and with respect to a color splitting prism 3 and a lens 4. For each pick-up tube 2, the holder 1 comprises an annular seat 5 on which the relevant pick-up tube 2 is pressed, by way of an adapter ring 7 which is connected thereto transversely of the tube axis 6, by means of a resilient pressure member 8 which acts in the direction of the tube axis 6. The pressure member 8 comprises a cylindrical pressure piece 9 which can be screwed onto the holder 1 by way of threads 10, said pressure being exerted by means of a resilient O-ring 11 and a ring 12 connected to the pick-up tube 2. Besides the adapter ring 7 and the ring 12, a coil unit 13 is also mounted on the pick-up tube 2.

Figure 2:
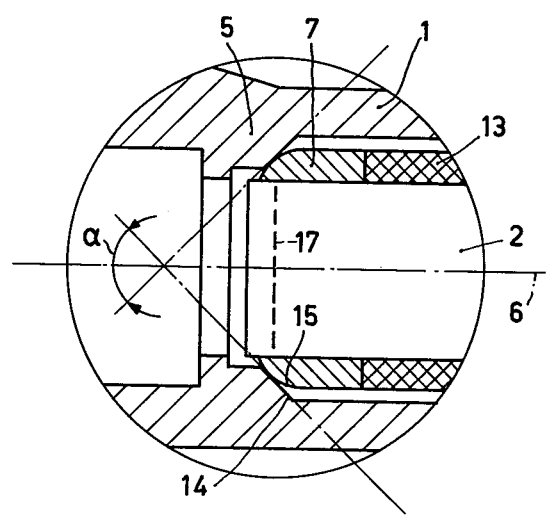
FIG. 2 shows the encircled part of FIG. 1 at an increased scale.

A first one of the parts of the seat 5 and the adapter ring 7 which are pressed together is formed by a circular cone 14 which extends coaxially with the tube axis 6 and whose diameter decreases in the pressing direction. The second part has a cross-section, viewed in a plane through the tube axis, with a slight curvature 15 towards the seat; this curvature is shown in exaggerated form in FIG. 1 for the sake of clarity. For the sake of clarity, FIG. 2 shows the part which is situated within the circle II in FIG. 1 at an increased scale. The apex angle of the circular cone 14 equals $\alpha$, the value of which is preferably chosen between 40° and 120°.

Figure 3:
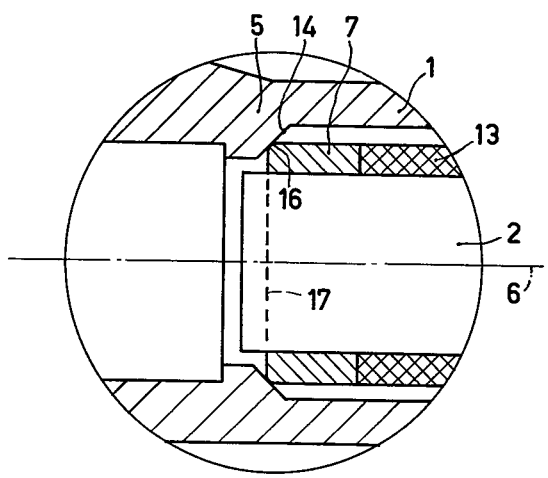
FIG. 3 shows a further embodiment in accordance with the invention of FIG. 2.

FIG. 3 shows a further embodiment of the parts of the seat 5 and the adapter ring 7 pressed together (for corresponding parts, the same reference numerals are used as in the FIGS. 1 and 2). The part of the seat 5 is formed as a circular cone 14 which extends coaxially with the tube axis 6 and against which the adapter ring 7 is pressed by way of a rounded straight edge 16. The radius of curvature of the rounding is small.

In a further preferred embodiment (not shown) of the parts of the seat 5 and the adapter ring 7 pressed together, the latter is formed as a circular cone which extends coaxially with the tube axis 6 and which is pressed against a straight, rounded ege of the seat 5.

After mounting, there is no play between the pick-up tubes 2 and the holder 1; after resilient pressing, the positioning is insusceptible to shocks due to the play-free mounting. As a result, the optical positions of picture rasters to be scanned on the diagrammatically shown photosensitive layers 17 of the pick-up tubes 2 are very stable with respect to each other. The television camera is also insusceptible to shocks if the annular seat 5 or the adapter ring 7 does not form a closed ring, but rather a composite ring which comprises, for example, three ring segments which are situated on a circle and which form cams.

Figure 4:
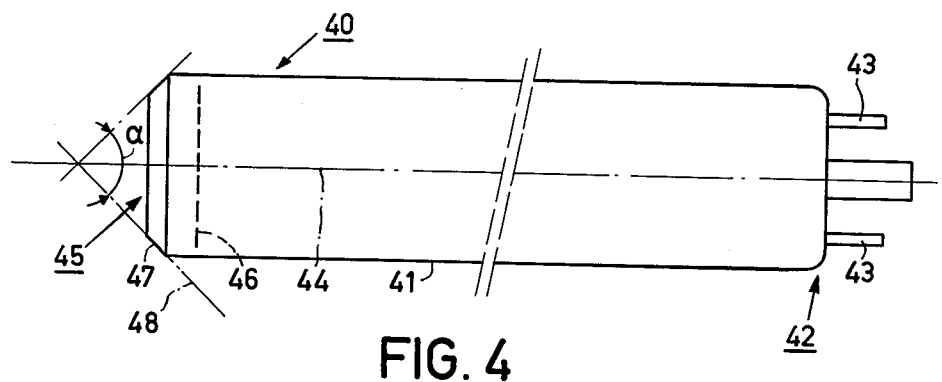
FIG. 4 shows a pick-up tube in accordance with the invention for use in a televison camera as shown in FIG. 1.

FIG. 4 shows a pick-up tube 40 for use in a television camera, a relevant part of which is shown in FIG. 1. A cylindrical glass tube 41 is sealed on one end by an end wall 42 wherethrough electrical connections 43 are passed, and on its other end by a light admitting entrance window 45 which is directed transversely of the tube axis 44. The reference numeral 46 denotes the photosensitive layer (only diagrammatically shown). The cylindrical glass tube 41 is provided, near the entrance window 45, with an adapter ring which is directed transversely of the tube axis 44 and which consists of an adapter edge 47 in the form of a circular cone 48 which extends coaxially with the tube axis 44 and which has an apex angle $\alpha$. The value of $\alpha$ is preferably chosen between 40° and 120°.

Figure 5:
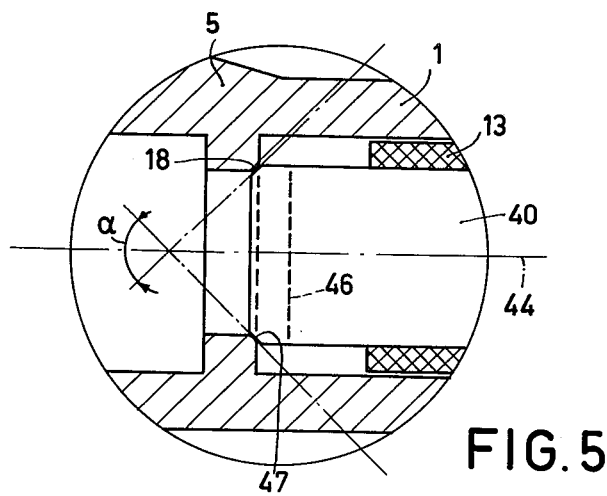
FIG. 5 shows the part shown in FIG. 2, provided with a pick-up tube as shown in FIG. 4.

FIG. 5 shows an embodiment of parts of the seat 5 and the adapter edge 47 of the pick-up tube 40 of FIG. 4 which are pressed together. (For corresponding parts, the same reference numerals are used in FIGS. 1 and 4). The adapter edge 47 is pressed against a straight, rounded edge 18 of the seat 5.

Figure 6:
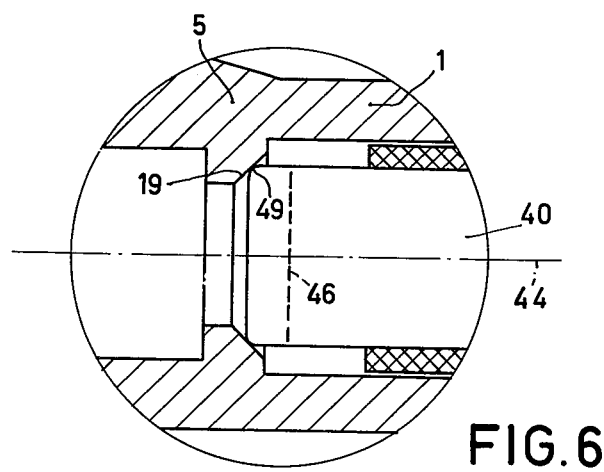
FIG. 6 shows the part shown in FIG. 2, provided with a further embodiment of a pick-up tube in accordance with the invention.

FIG. 6 shows an embodiment of parts of the seat 5 and a pick-up tube 40, having a ground, straight, rounded edge 49, which are pressed together. The seat 5 is formed as a circular cone 19 which extends coaxially with the tube axis.

Even though the invention has been described with reference to a camera comprising three pick-up tubes, the invention offers the same advantages for a two-tube camera.

What is claimed is:

1. A television camera in which a color splitting prism and a plurality of pick-up tubes are positioned with respect to each other in a holder which comprises a plurality of annular seats for optical alignment of each respective pick-up tube, each of said pick-up tubes having an adapter ring, which is connected to the tube transversely of the tube axis, for engaging said respective seat, and a resilient pressure member, acting in the direction of the tube axis, for pressing said adapter ring against said seat, wherein the diameter of the parts of the seat and the adapter ring which are to be pressed together decreases in the pressing direction.

2. A television camera as claimed in claim 1, wherein one of the parts of the seat and the adapter ring to be pressed together is shaped as a circular cone, while the other part has a cross-section, viewed in a plane through the tube axis, which is slightly curved towards the surface of the circular cone.

3. A television camera as claimed in claim 1 or 2, wherein the first one of the parts of the seat and the adapter ring which are to be pressed together is formed by a circular cone having an apex angle between 40° and 120°.

4. A pick-up tube for use in a television camera as claimed in claim 1, comprising a cylindrical glass tube which is sealed on one end by an end wall wherethrough electrical connections are passed and on the other end by a light-admitting entrance window which is directed transversely of the tube axis, wherein near the entrance window, the cylindrical glass tube is provided with an adapter ring which is directed transversely of the tube axis.

5. A pick-up tube as claimed in claim 4, wherein the adapter ring consists of an adapter edge formed on the glass.

6. A pick-up tube as claimed in claim 5, wherein the adapter edge is formed as a circular cone having an apex angle between 40° and 120°.

* * * * *